(12) United States Patent
Bolduc

(10) Patent No.: US 7,190,878 B2
(45) Date of Patent: Mar. 13, 2007

(54) EDITING VIDEO DATA

(75) Inventor: Marc Bolduc, St-Luc (CA)

(73) Assignee: Autodesk Canada Inc., Montreal (CA)

( * ) Notice: Subject to any disclaimer, the term of this patent is extended or adjusted under 35 U.S.C. 154(b) by 1565 days.

(21) Appl. No.: 09/733,582

(22) Filed: Dec. 7, 2000

(65) Prior Publication Data

US 2002/0018640 A1 Feb. 14, 2002

(30) Foreign Application Priority Data

Mar. 31, 2000 (GB) .............................................. 0007698

(51) Int. Cl.
G11B 27/00 (2006.01)
G11B 27/02 (2006.01)
G11B 5/027 (2006.01)

(52) U.S. Cl. ............................. 386/52; 386/4; 386/52; 360/13; 360/83

(58) Field of Classification Search ................... 386/52, 386/46, 4, 5, 102; 360/13; 369/83
See application file for complete search history.

(56) References Cited

U.S. PATENT DOCUMENTS

| 5,452,235 A | | 9/1995 | Isani |
| 5,764,298 A | * | 6/1998 | Morrison ..................... 348/500 |
| 6,111,897 A | * | 8/2000 | Moon .......................... 370/535 |
| 6,360,271 B1 | * | 3/2002 | Schuster et al. ............. 709/231 |
| 6,434,606 B1 | * | 8/2002 | Borella et al. ............... 709/214 |
| 6,658,027 B1 | * | 12/2003 | Kramer et al. .............. 370/516 |

FOREIGN PATENT DOCUMENTS

WO WO98/10586 3/1998

* cited by examiner

*Primary Examiner*—Thai Tran
*Assistant Examiner*—Jamie Vent
(74) *Attorney, Agent, or Firm*—Gates & Cooper LLP

(57) ABSTRACT

Original video data of a first format is edited. The first format video data has jitter frames (626) inserted therein and is displayed at a first frame rate. The original video data is read from a video tape recorder (301) in the first format and converted into a second format with no jitter frames, displayable at a second display rate. Time-code of the converted video data is related to time-code of the original video data so as to identify frame types for the converted video data. A portion (603–606) of the converted video data is modified to produce modified video data in the second format. New video data is generated in the first format by processing the modified video data. An edit processor is configured to replace an edit portion of the stored original data with the new data by defining an edit range with reference to the new data, selecting an edit field with reference to the frame type so as to initiate an edit on a data boundary. New data is written to the video tape recorder and an edit field is selected again before completing the writing process. In this way, video edits occur at positions that are consistent with data boundaries irrespective of the selected edit position.

23 Claims, 10 Drawing Sheets

EDITING VIDEO DATA

BACKGROUND OF THE INVENTION

1. Field of the Invention

The present invention relates to editing original video data of a first format, wherein said first format has inserted jitter frames and is displayable at a first frame rate.

2. Description of the Related Art

It is well known that commercial video systems operate at thirty frames per second, slightly less than thirty frames per second (NTSC drop frame) or twenty-five frames per second; rates determined primarily by the frequency of AC mains supplies. It is also well known that high quality cinematographic film is displayed at twenty-four frames per second, therefore there is an inherent difficulty in terms of converting film images into video data.

A process of 2:3 insertion for converting from twenty-four frames per second to thirty frames per second is well known and results in five output frames being generated from four input frames on a repeating cycle. Input frames making up the cycle are usually referred to as A, B, C and D frames from which five output frames are generated. A further complication with commercial video systems is that each frame is generated from two interlaced fields therefore it is more correct to think in terms of generating ten output fields from four input frames.

The known 3:2 insertion process generates three output frames that are derived from a whole input frame. However, in addition to this, two frames are constructed in which interlaced fields are derived from different input frames such that when viewed as a still frame, there is a tendency for the image to jitter, particularly if movement has occurred between the two source frames.

After 3:2 inserted video material has been produced, it may be necessary to perform post production activities resulting in material being modified. In order to do this, the inserted video is reconverted back into material at twenty-four frames per second whereafter (theoretically) edits could occur at any frame boundary. However, given that material must be written back to an inserted video stream, known systems only allow edits at the boundaries between a D Frame and an A Frame, that is to say, at the start of the insertion cycle. Consequently, material that has been processed in this way introduces a further limitation into the editing process which may result in artistic compromises being made or may result in the introduction of artefacts.

BRIEF SUMMARY OF THE INVENTION

According to an aspect of the present invention there is provided apparatus for editing original video data of a first format, wherein said first format has inserted jitter frames and is displayed at a first frame rate, comprising reading means configured to read original video data in said first format from a video storage device; converting means for converting said video data read by said reading means into converted video data having a second format with no jitter frames, displayed at a second display rate; relating means configured to relate time-code of said converted video data to time-code of said original data so as to identify frame types for said converted video data; modifying means configured to modify portion of said converted video data to produce modified video data in said second format; generating means configured to generate new video data in said first format by processing said modified video data; and edit processing means configured to replace an edit portion of stored original data with said new data by defining an edit range with reference to said new data, selecting an edit field with reference to said frame types so as to initiate said edit on a data boundary, write said new data to said storage device, and select an edit field again for completing said process of writing said new data with reference to said frame type data so as to complete the edit on a data boundary.

BEST MODE FOR CARRYING OUT THE INVENTION

Figure 1:
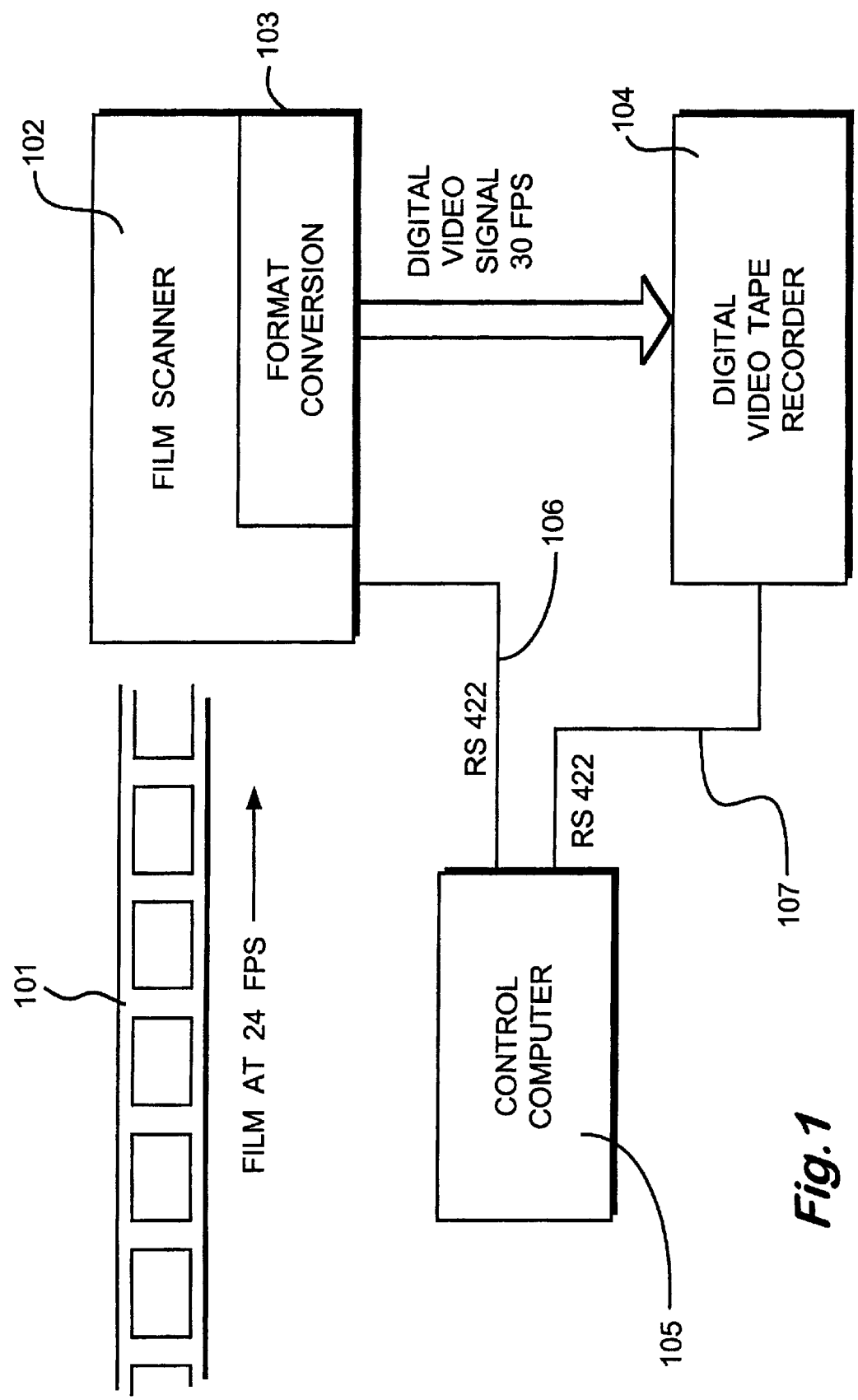
FIG. 1 shows a system for recording cinematographic film onto digital video tape.

A system for recording cinematographic film onto digital video tape is illustrated in FIG. 1. Cinematographic film stock 101, configured to be displayed at a rate of twenty-four frames per second is received by a film scanner 102, configured to generate high definition video signals at an off-line speed less than the real-time display rate.

Film scanner 102 includes a format conversion process 103 arranged to convert image signals scanned at 23.98 frames per second (notionally twenty-four frames per second) into a digital video signal with frames at 29.97 frames per second (notionally thirty frames per second). The thirty frame per second digital video signal is supplied to a digital video tape recorder 104 and both the film scanner 102 and the digital video tape recorder 104 are controlled by a control computer 105 over RS422 serial interfaces 106 and 107.

Figure 2:
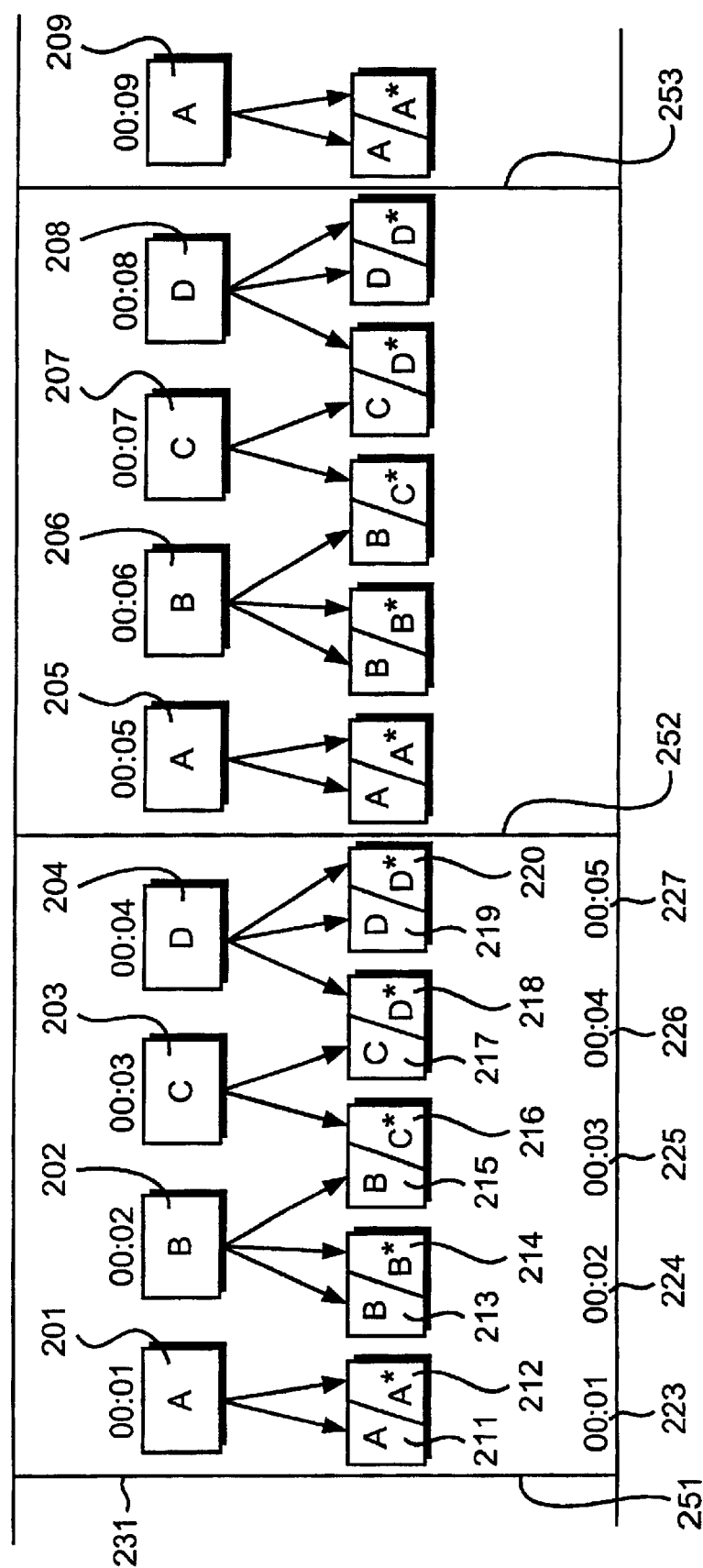
FIG. 2 illustrates the format conversion process identified in FIG. 1.

Format conversion process 103 is illustrated in FIG. 2. Film scanner 102 produces a progression of frames derived from images captured on film 101. These are effectively a progression of still frames captured at a particular instant in time and therefore differ from a video signal generated by a video camera which produces a frame by scanning the image as two interlaced rasters such that, in effect, each pixel of data represents a portion of the image captured at a unique point in time. Progressive frames produced by the film scanner are initially generated at twenty-four frames per second and as such are usually identified as 24P frames, referenced 201 to 209. In order to perform a conversion process, a first frame 201 is identified as a type A frame, with the next frame 202 being identified as a type B frame, the next frame 203 being identified as a type C frame while frame 204 is identified as a type D frame. This sequence A B C D then repeats such that frame 205 is identified as a type A, frame 206 is identified as a type B, frame 207 is identified as a type C, frame 208 is identified as a type D and frame 209 is identified as a type A etc.

The progressive frames are generated at a rate of twenty-four frames per second therefore the cycle of four frames repeats six times each second. Digital video tape recorder 104 requires digital video signals at a rate of thirty frames per second therefore during the repetition period it is necessary to generate five video frames made up of a total of ten video fields. The fields are interlaced and thereby occupy odd or even lines respectively, the odd line field being referred to as a first field type and the even line field being referred to as a second field type. In this example, progressive frames 201 to 204 provide source material for generating output fields 211 to 220. When generating these fields, video data from the progressive frames is effectively inserted into field positions, with a first field of data being identified by a similar letter to its originating frame while a second field of data is identified by a similar letter followed by a star. Thus, both the fields 211 and 212 are derived from frame 201 and the fields making up this frame are identified as A and A* respectively.

At the video tape recorder 104, each of the generated frames is allocated a time-code, such as codes 223 to 227. In their full form, these time-codes represent hours: minutes: seconds: frames but in the example shown only entries for seconds and frames have been included. In the majority of situations, time-codes would often include an off-set such that, for example, the full time-code 223 may effectively start at the tenth hour and be fully represented as 10:00:00:01. Notionally, the originating progressive frames 201 to 209 also include time-codes, such as code 231 and in the system described subsequently, these codes are effectively reconstituted.

As illustrated in FIG. 2, a first output frame with time-code 00:01 is derived exclusively from input frame 201 or, looking at this the other way round, frame 201 inserts two data fields into the output stream.

Input frame 202 is dealt with differently in that it inserts three output fields into the data stream consisting of field 213 and field 214, to make up output frame 00:02 while also making a contribution to output frame 00:03 by the insertion of data to field 215, this being the same data as inserted in field 213. Thus, on this occasion there has been a three field insertion.

Input frame 203 is processed differently again in that it provides a two field insertion but these are made to different output frames, consisting of a second field insertion to position 216 and a first field insertion to position 217. The cycle is completed by a further three field insertion derived from input frame 204 and consisting of the generation of output fields 218, 219 and 220.

In this example, the high definition input film has been scanned to produce high-definition output video data at thirty per frames per second. In alternative configurations, standard video data may be produced and when produced in accordance with NTSC recommendations, this may also include drop frame time-codes, accomplished by making some output time-codes illegal as is well known in the art. It is also known to produce high definition video signals with drop frame time-codes. Furthermore, having produced high-definition video signals this may also be further reconverted to standard definition broadcast video signals, possibly following different standard recommendations. Thus, a high-definition video source may be used to generate NTSC signals and PAL signals in addition to providing a source for high-definition broadcasts.

Techniques for the manipulation and editing of digitised video data are well known and such a system is licensed by the present Assignee under the Trademark "INFERNO". This facilitates a significant degree of post production activity allowing video to be edited and allowing modifications to be made, such as the inclusion of graphics and more complex special effects. Thus, many situations arise in which, after digitisation into a digital video signal, there is a requirement for further editing and modification to be performed prior to a final video output tape being produced.

Figure 3:
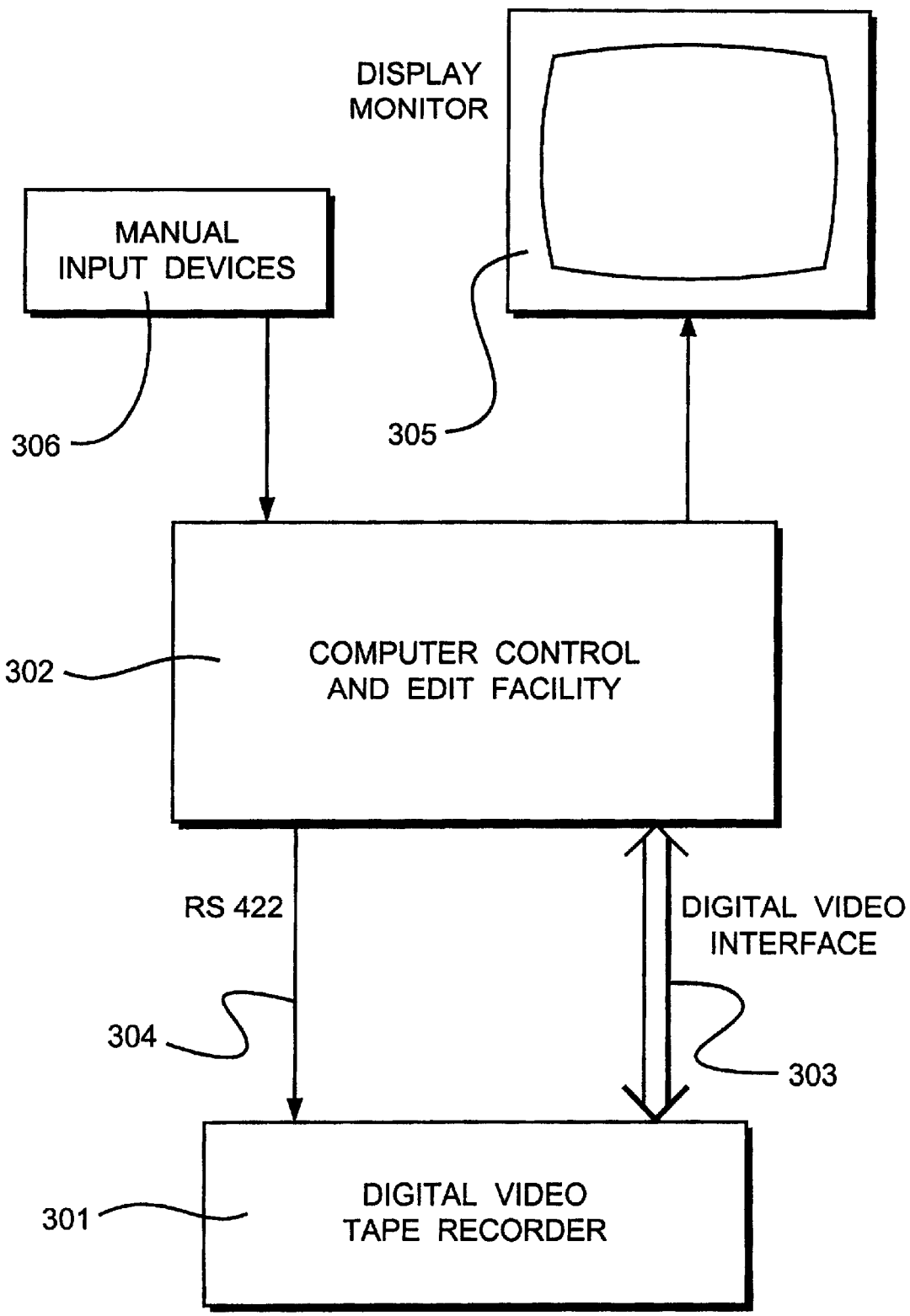
FIG. 3 shows a video editing facility.

A video editing facility is installed in FIG. 3. Digital video material is replayed from a standard digital video tape recorder 301, possibly similar to tape recorder 104 shown in FIG. 1. Digital video images are supplied to a computer control and edit facility 302 over a digital video interface 303. The digital video tape recorder 301 is also controlled by the computer control and edit facility 302 via a serial RS422 control interface 304. In order for manipulations to be performed, the computer control and edit facility 302 is interfaced to a display monitor 305 and manual input devices 306.

Figure 4:
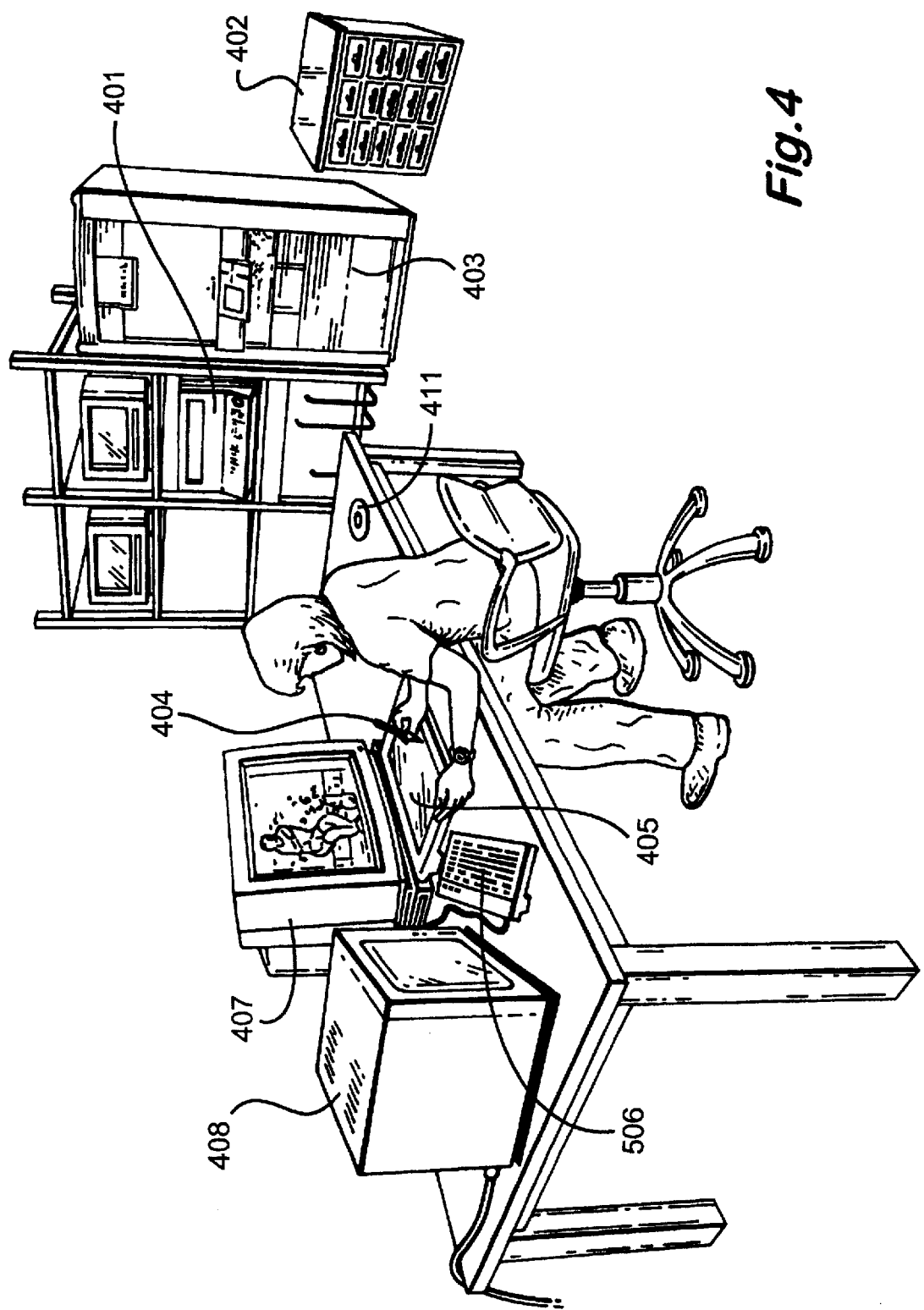
FIG. 4 shows a computer controlled editing station of the type identified in FIG. 3.

A computer controlled editing station of the type illustrated in FIG. 3 is detailed in FIG. 4, including a high definition video tape recorder 401. Video data at thirty frames per second, twenty-four frames per second or any other supported frame rate is written to and read from a plurality of randomly accessible discs 402 arranged in a redundant array. The system is built around a computer system 403 such as an Onyx II computer manufactured by Silicon Graphics Inc.

An operator controls applications performed on the processing system 403 by means of a stylus 404 applied to a touch tablet 405 in combination with the keyboard 406. Images and control menus are supplied to a high definition visual display unit 407 and video images are also supplied to a broadcast quality monitor 408. Operating instructions accessible by the processing system 403 are received by means of a computer readable medium, such as CD-ROM 411 receivable within an appropriately configured CD-ROM player.

Figure 5:
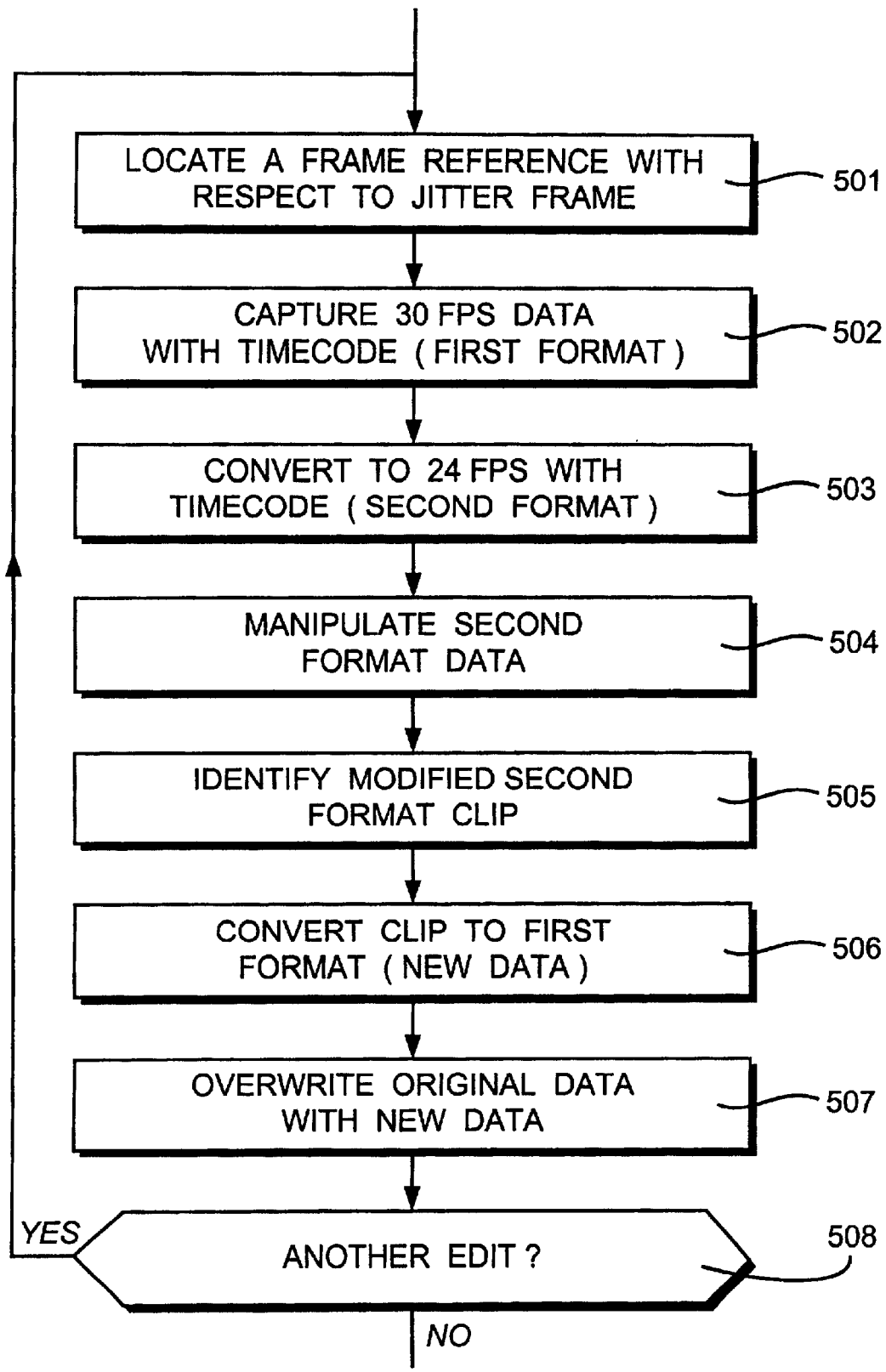
FIG. 5 illustrates operations performed by the system shown in FIGS. 3 and 4.

Operations performed by the computer-based system illustrated in FIG. 3 and detailed in FIG. 4 are identified in FIG. 5. At step 501, an operator locates a frame reference with respect to a jitter frame. At step 502 data is captured at thirty frames per second with time-code (or with drop frame time-code), effectively in a first format. At step 503, the system converts the video data capture at step 502 to progressive data at twenty-four frames per second again with time-code and this may be considered as being in a second format.

At step 504 manipulations are performed on the reconverted data which may take the form of an edit or a re-composition. Edits would not generally increase or reduce the length of a particular clip but they would result in material being modified and thereby require this modified material to be written back to the digital tape recorder 301 at appropriate locations.

At step 505 the modified second format clip (i.e. 24P) is identified as the portion of the clip that is to be written back to the tape recorder. At step 506 this clip is converted again into the first format, i.e. the thirty frame per second jitter frame inserted format.

Steps 506 and 507 effectively take place in unison, with the system performing the 2:3 insertion process as the material is being written onto the tape, based on the reference A frame time-codes.

The video tape edit is performed at step 507 by the new data overwriting an appropriate portion of the original data such that the modification is then included on the material held on the digital video tape, without requiring all of the material to be rescanned, reprocessed and then rewritten to video tape.

Performing modifications upon the 24P data, converting this data to thirty frames per second inserted and then performing an edit to video tape is relatively straightforward if edits only occur at the boundaries between D and A frames, such as boundaries 251, 252 and 253 as shown in FIG. 2. However, if edits are required at other frame boundaries, problems arise which, in previous systems generally resulted in the introduction of artefacts. A problem occurs, for example, if an edit is to start at a boundary between an A frame and a B frame, say, and then finish at a boundary between a C frame and a D frame.

It is possible for a video tape recorder to be instructed such that edits occur on the first field of a frame or on the second field of a frame. When edits occur on the first field, the cuts effectively take place along frame boundaries such that, for example, the frame made up of fields 211 and 212 of FIG. 2 would remain intact and edits could only occur on either side of these fields. Similarly, when edits occur on the second field, it would not be possible to put a break between fields 212 and 213, actually in different frames, although an edit could occur between fields 211 and 212 or between fields 213 and 214, effectively breaking the notional frame in half.

When edits are specified by time-code, the code at the start of the edit is inclusive and that at the end of the edit is exclusive, therefore a set-in time-code represents a time-code of the first frame to be replaced and a set-out time-code represents the time-code of the frame after the last frame to be replaced. In the editing system, edits are defined at boundaries of 24P frames, after which the system is configured to reconstitute the edit from 2:3 pull down inserted frames in such a way as to faithfully restore the edit in the first format stored on video tape.

Figure 6:
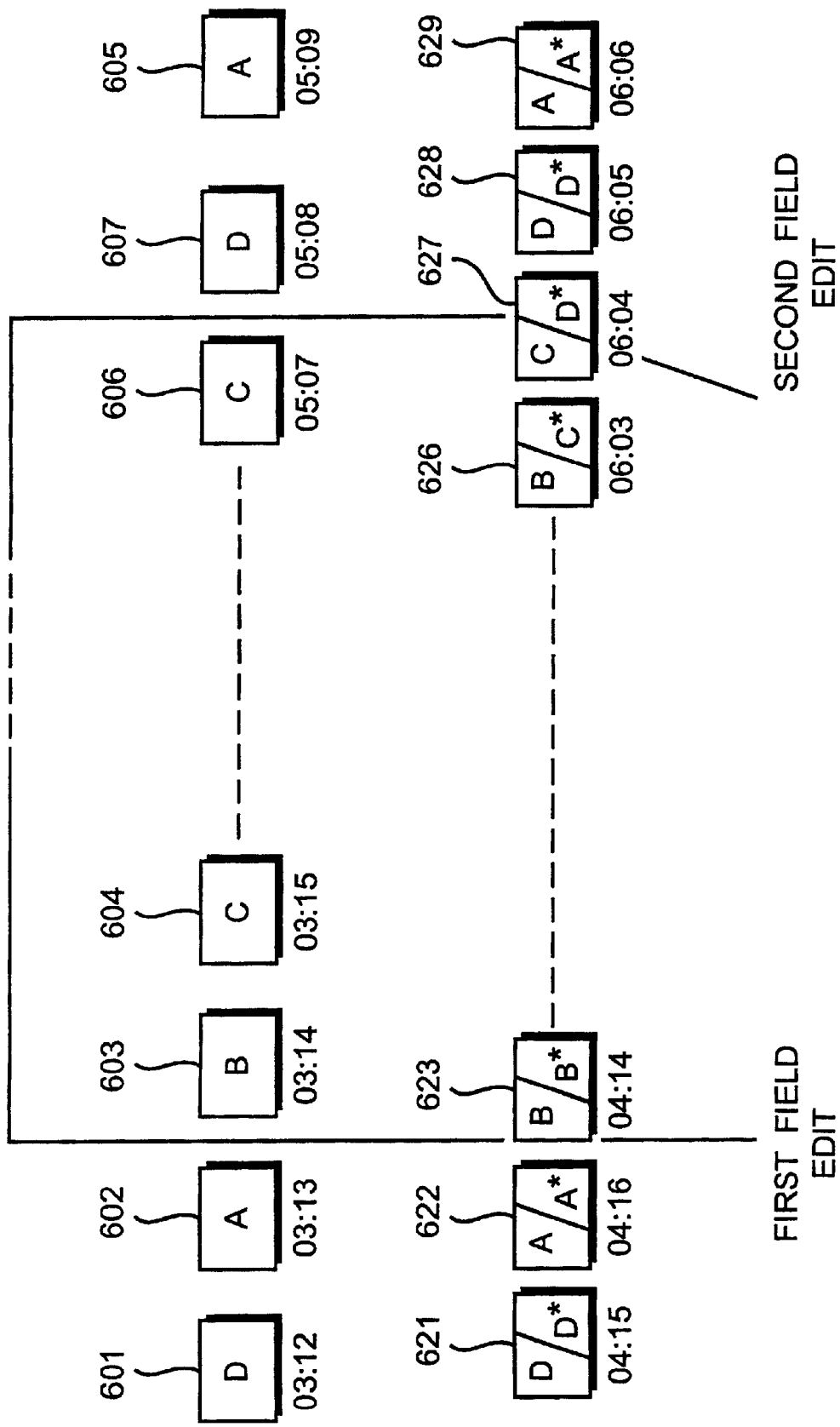
FIG. 6 illustrates an example of an editing operation.

An example of an edit is illustrated in FIG. 6. A clip consists of a sequence of 24P frames 601, 602, 603, 604 etc to frame 605 having time-codes 03:12 to 05:09; hours and minutes not being shown in order to improve clarity. Following operations performed to find a reference "A" frame on tape, the frame types are known, with frame 601 being of type D, frame 602 being of type A, frame 603 being of type B, frame 604 being of type C etc, with frame 606 being of type C, frame 607 being of type D and frame 605 being of type A.

Manipulations have been performed on the computer system and from this it has been determined that the new material should be set-in from frame 03:14 and set-out at frame 05:07. In order to achieve an edit of this type without introducing artefacts, all material derived from frames 603, 604 and all the frames in-between up until frame 606 is to be replaced, whereas material derived from frame 602 and earlier frames along with material from frame 607 and later frames is to be retained without modification.

24P frames 601 to 605 were generated from inserted frames 621 to 629 but frames 603 to 606 have been modified therefore similar modifications need to be made to appropriate frames/fields of the inserted video so that the appropriate portion of modified inserted video may be then written back to the tape recorder. Frame 622 at time-code 04:16 is derived from frame 602 at time-code 03:13 similarly, frame 623 is derived exclusively from frame 603. This facilitates an edit of the video material given that an edit cut may occur at the boundary between frame 622 and frame 623.

On the set-out side frame 606 has been modified and frame 607 has not been modified. Thus, material derived from frame 607 is to be retained and not overwritten whereas material derived from frame 606 has been modified and is therefore to be overwritten on the tape. On this occasion however the cut does not occur at a frame boundary given that frame 627 is a jitter frame, having received an insertion from frame 606 with a complementary insertion from frame 607. A problem therefore exists in that the set-in edit, between frame 622 and 623 occurs on the first field with the set-out edit at frame 627 occurring on the second field.

The invention overcomes this problem of performing an edit upon video data of a first format in which the first format has inserted jitter frames and is displayable at a first frame rate. The original video data in the first format is read from a storage device, such as a video tape recorder. The video data is converted into converted video data having a second format with no jitter frames thus, having fewer frames removed, the second format is displayable at a second display rate. Preferably, the image data is written to randomly accessible storage and a time-code is allocated to both the first format frames and the second format frames. Having generated the second format data, this data is then available for modifications to be made such that a portion of the converted video data may be modified to produce modified video data in the second format.

However, this modified data cannot be written back to the video tape in its converted form. The generation of new data, i.e. back into its first format, is performed while data is being written back to the video tape recorder and the processing is effected in real-time. An edit portion on video tape is then replaced by the new data by performing an editing process. During this editing process an edit range is defined with reference to the new data. The tape recorder is responsive to field edit commands and as such an edit field is selected with reference to the frame type so as to initiate the edit on a data boundary. With this data boundary selected, new data is written to the storage device ensuring that the cut point in the first format video is correct with reference to the specified cut point in the second format video. As shown in FIG. 6, this does not in itself provide a total solution, given that the edit field at the end of the edit may be different from the edit field at the beginning of the edit. Consequently, while data is being written to the video tape, the edit field is selected again before completing the writing step, with reference to the frame type data so as to complete the edit on the data boundary.

Thus, by maintaining a mapping of time-codes related to an A-frame reference and thereafter calculating frame types, it is possible to determine what type of field edit is required at the set-in point and at the set-out point. Furthermore, if the field type between these two points differs, the field edit type is changed while the data is being transferred so as to ensure that the correct type of field edit occurs at the set-out point.

Figure 7:
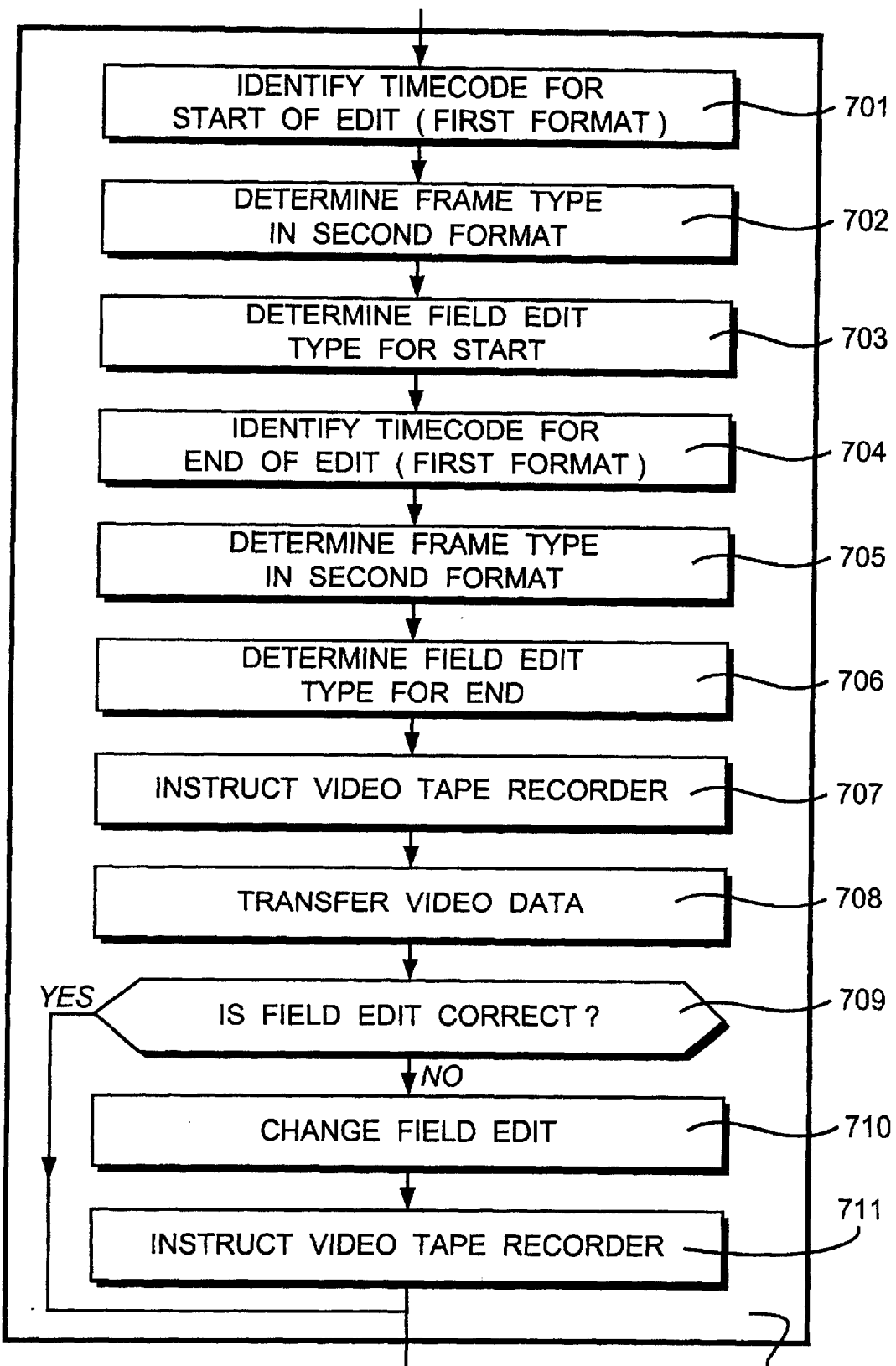
FIG. 7 details an overwriting operation identified in FIG. 5.

Step 507 for overwriting original data on video tape with the new data generated by the computer system is detailed in FIG. 7.

At step 701 the new first format clip (inserted thirty frame per second video) is considered to identify a time-code for the start of the edit. At step 702, this time-code is compared with time-codes timed similarly to the "A" frame reference time-code to determine a start frame type. Thus, referring to FIG. 6, the time-code of frame 623 is identified that in turn corresponds to a start frame type of BB* thereby making frame 603 a "B" frame. This identifies the second format start frame type at step 702. Thus, at step 703, a determination is made as to what type of field edit is required. In this example, given that the edit starts on a B type frame, a first field edit type is required in order to effect the cut at the boundary between frames 622 and 623.

At step 704 a similar process is initiated for the end of the edit and a time-code is identified for the last first format type frame included in the edit. In the example shown in FIG. 6, this occurs at frame 627 which is derived from frames 606 and 607. Thus, on this occasion, a time-code is identified as 06:06 at step 704.

At step 705 the frame type is identified as a C type, i.e. frame 606 whereafter at step 706 the field edit type is identified as requiring an edit on the second field. This is to ensure that the material from frame 606 is replaced while the material from frame 607 is retained. It should be noted that first format set-in time-codes on DD* frames are not possible since the D frame does not begin there. Also, set-out time-codes on BC* frames are not possible since no second format frames end on the preceding BB* frame.

At step 707 the video tape recorder is instructed to initiate the edit and at step 708 video data is transferred. At step 709 a question is asked as to whether the edit field type is correct, that is to say, whether the field type determined at step 706, for the end of the edit, is the same as the field type determined at step 703, for the beginning of the edit. If these field types differ, the question asked at step 709 is answered in the negative and the field type edit is changed at step 710. Thereafter at step 711 a further instruction is supplied to the tape recorder changing the field type edit so as to ensure that a correct type of edit occurs at the set-out point. Alternatively, if the question asked at step 709 is answered in the affirmative, no further action is required and control continues to step 508.

Figure 8:
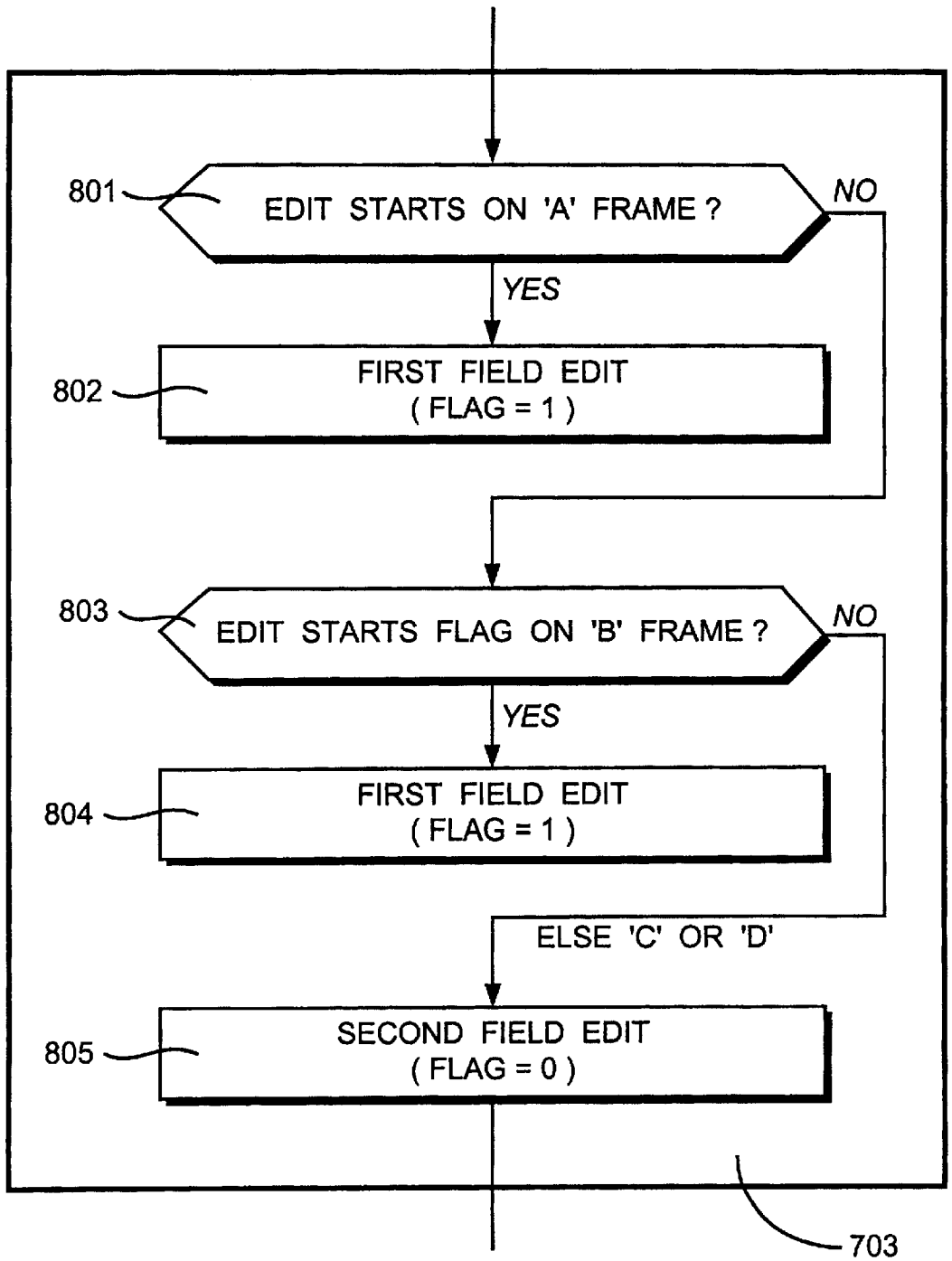
FIG. 8 details procedures for determining a field edit type, identified in FIG. 7.

Step 703 for determining the field edit type at the start of the edit process, i.e. the set-in point, is detailed in FIG. 8.

At step 801 a question is asked as to whether the edit starts on an A frame and if answered in the affirmative, a flag is set equal to one, to confirm that the field edit is to take place on the first field. Alternatively, if the question asked at step 801 is answered in the negative, control is directed to step 803 at which a question is asked as to whether the edit starts on a B frame. Again, if answered in the affirmative, the flag is set equal to one, representing a condition to the effect that the edit is to take place on the first field.

Alternatively, if the question asked at step 803 is answered in the negative, control is directed to step 805 and under these conditions the edit will be initiated on a C frame or a D frame requiring the edit to be effected on the second frame resulting in the flag being set equal to zero. Thus, if the edit does not start on an A frame or does not start on a B frame the edit must be on a C or a D frame requiring the cut to take place on the second field.

Figure 9:
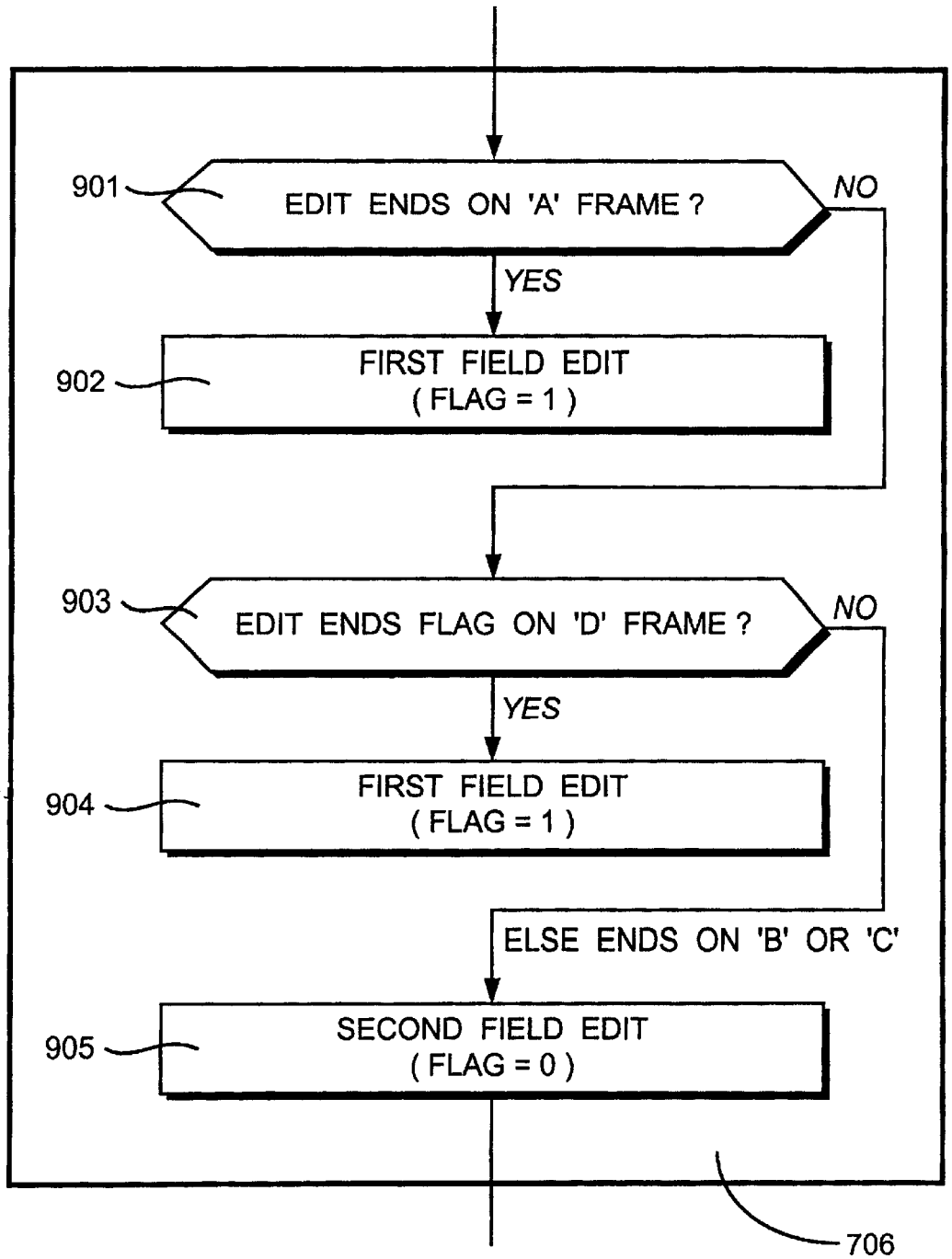
FIG. 9 illustrates procedures for determining a field edit type at the end of an edit procedure.

Step 706, for determining the field edit type at the end of the edit, is detailed in FIG. 9. At step 901 a question is asked as to whether the edit ends at the end of an A frame. If answered in the affirmative, control is directed to step 902 resulting in the field flag being set equal to one representing a condition to the effect that the edit takes place on the first field.

If the question asked at step 901 is answered in the negative, control is directed to step 903 where a question is asked as to whether the edit ends at the end of a D frame. Again, if answered in the affirmative, the field flag is set equal to one representing a condition to the effect that a first field edit is required. If the question asked at step 903 is answered in the negative, the edit must end on a B type frame or a C type frame under which conditions an edit is required on the second field resulting in the field flag being set equal to zero at step 905.

Figure 10:
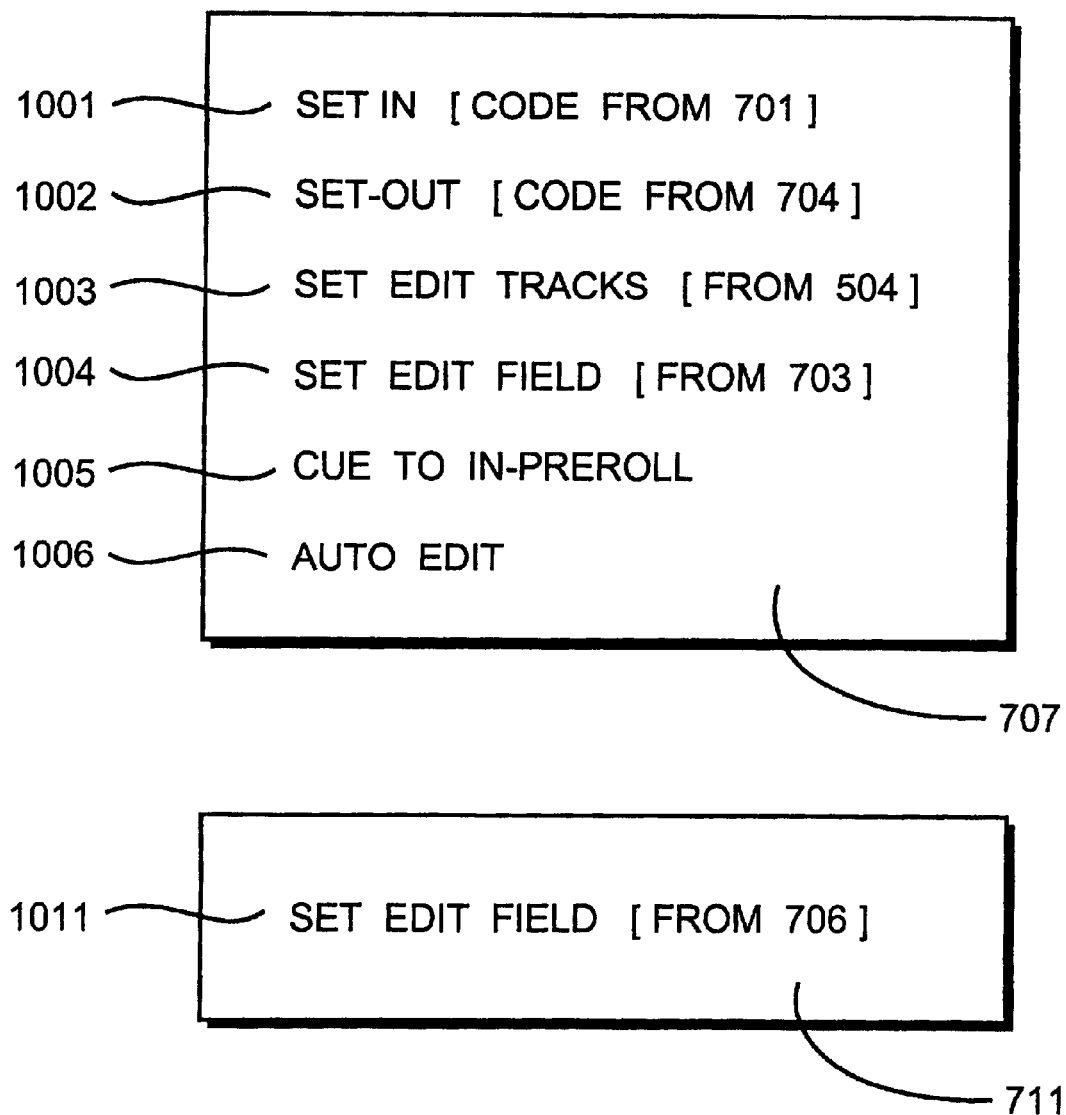
FIG. 10 illustrates instructions supplied over a serial interface to a video tape recorder.

Step 707 of FIG. 7 generates instructions to the video tape recorder, over the serial interface 304, of the type illustrated in FIG. 10. At line 1001 a set-in instruction is sent instructing the video recorder to initiate an edit from the frame defined by the time-code calculated at step 701. At line 1002 a setout instruction is issued to the video tape recorder identifying a time-code for the end of the edit derived from the calculation performed at step 704.

At line 1003 edit tracks are identified usually in the form of a video track plus several audio tracks. The particular tracks under consideration are defined during the manipulation of the video data at step 504.

At line 1004 an instruction to "set the edit field" is issued derived from the determination made at step 703. Thus, line 1004 identifies whether the edit is to be performed on the first field (F1) or on the second field (F2).

At line 1005 the physical editing process is initiated by a command to cue to In pre-roll. This rewinds the tape recorder in accordance with established pre-roll techniques ensuring that the mechanism of the machine is fully in synchronism with the input video stream prior to the actual edit being initiated. This is then followed at line 1006 by the command to "auto edit".

As previously described, if the question asked at step 709 is answered in the negative, further action must be taken in order to ensure that the edit correctly terminates at the required field position. At step 710 the field edit flag is changed resulting in a further instruction being issued at step 711 as shown in FIG. 10. This takes the form of a further command at line 1011 similar to the command issued at line 1004, taking the form "set edit field" but on this occasion effectively deriving the field edit data from step 706.

Thus, these procedures facilitate accurate insertions to be made during an editing process such that editors are not restricted when source material includes inserted jitter frames and field accurate edits can be accomplished without the introduction of any artefacts.

What is claimed is:

1. Apparatus for editing original video data of a first format, wherein said first format has inserted jitter frames and is displayed at a first frame rate, comprising
   reading means configured to read original video data in said first format from a video storage device;
   converting means for converting said video data read by said reading means into converted video data having a second format with no jitter frames, displayed at a second display rate;
   relating means configured to relate time-code of said converted video data to time-code of said original data so as to identify frame types for said converted video data;
   modifying means configured to modify a portion of said converted video data to produce modified video data in said second format;
   generating means configured to generate new video data in said first format by processing said modified video data; and
   edit processing means configured to replace an edit portion of stored original data with said new data by defining an edit range with reference to said new data, selecting an edit field with reference to said frame type so as to initiate said edit on a data boundary, write said new data to said storage device, and select an edit field again before completing said process of writing said new data with reference to said frame type data so as to complete the edit on a data boundary.

2. Apparatus according to claim 1, wherein said first format has a display rate of twenty-five frames per second to thirty frames per second.

3. Apparatus according to claim 2, wherein said frames are generated by scanning cinematographic film.

4. Apparatus according to claim 1, wherein said second format has a display rate of twenty-four frames per second.

5. Apparatus according to claim 1, wherein said frame type is identified by locating the position of jitter frames.

6. Apparatus according to claim 1, wherein said modifying means includes a display device and a manual input device.

7. Apparatus according to claim 1, wherein said edit processing means supplies control commands to said storage device.

8. Apparatus according to claim 7, wherein said storage device is a digital video tape recorder.

9. Apparatus according to claim 8, wherein said edit processing means issues a set edit field command to said video tape recorder before starting an edit.

10. Apparatus according to claim 8, wherein said edit processing means issues a set edit field command to said video tape recorder before completing an edit.

11. A method of editing original video data of a first format, wherein said first format has inserted jitter frames and is displayed at a first frame rate, comprising the steps of
reading original video data in said first format from a video storage device;
converting video data read at said reading step into converted video data having a second format with no jitter frames, displayed at a second display rate;
relating time-code of said converted video data to time-code of said original data so as to identify frame types for said converted video data;
modifying a portion of said converted video data to produce modified video data in said second format;
generating new video data in said first format by processing said modified video data; and
replacing an edit portion of said stored original data with said new data by performing an editing process, said editing process including the steps of:
defining an edit range with reference to said new data;
selecting an edit field with reference to said frame type so as to initiate said edit on a data boundary;
writing said new data to said storage device; and
selecting an edit field again before completing said writing step with reference to said frame type data so as to complete the edit on a data boundary.

12. A method according to claim 11, wherein said first format has a display rate of twenty-five frames per second to thirty frames per second.

13. A method according to claim 12, wherein said frames are generated by scanning cinematographic film.

14. A method according to claim 11, wherein said second format has a display rate of twenty-four frames per second.

15. A method according to claim 11, wherein said frame type is identified by locating the position of jitter frames.

16. A method according to claim 11, wherein image frames are displayed by a display device and input instructions are received from a manual input device.

17. A method according to claim 11, wherein control commands are supplied to the storage device.

18. A method according to claim 17, wherein said storage device is a digital video tape recorder.

19. A method according to claim 18, wherein a set edit field command is issued to said video tape recorder before starting an edit.

20. A method according to claim 18, wherein a set edit field command is issued to said video tape recorder before completing an edit.

21. A computer-readable medium having computer-readable instructions executable by a computer such that, when executing said instructions, a computer will perform the steps of
reading original video data in a first format from a video storage device;
converting video data read at said reading step into converted video data having a second format with no jitter frames, displayed at a second display rate;
relating time-code of said converted video data to time-code of said original data so as to identify frame types for said converted video data;
modifying a portion of said converted video data to produce modified video data in said second format;
generating new video data in said first format by processing said modified video data; and
replacing an edit portion of said stored original data with said new data by performing an editing process, said editing process including the steps of
defining an edit range with reference to said new data;
selecting an edit field with reference to said frame type so as to initiate said edit on a data boundary;
writing said new data to said storage device; and
selecting an edit field again before completing said writing step with reference to said frame type data so as to complete the edit on a data boundary.

22. A computer readable medium having computer readable instructions according to claim 21, such that when executing said instructions a computer will also perform the step of supplying a set edit field command to a video tape recorder before starting an edit.

23. A computer-readable medium having computer-readable instructions according to claim 21, such that when executing said instructions a computer will also perform the step of issuing a set edit field command to a video tape recorder before completing an edit.

* * * * *